US011408586B1

(12) United States Patent
Lin

(10) Patent No.: US 11,408,586 B1
(45) Date of Patent: Aug. 9, 2022

(54) DISPLAY DEVICE

(71) Applicant: AU OPTRONICS CORPORATION, Hsin-Chu (TW)

(72) Inventor: Shih Che Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 17/587,219

(22) Filed: Jan. 28, 2022

(30) Foreign Application Priority Data

Feb. 24, 2021  (TW) .................................. 110106555

(51) Int. Cl.
*F21V 5/00* (2018.01)

(52) U.S. Cl.
CPC ...................... *F21V 5/00* (2013.01)

(58) Field of Classification Search
CPC ........................................................ F21V 5/00
See application file for complete search history.

(56) References Cited

U.S. PATENT DOCUMENTS

| 9,121,999 | B2* | 9/2015 | Yan ....................... G02B 6/0053 |
| 9,393,317 | B2* | 7/2016 | Benezra ............... A61K 31/713 |
| 10,209,410 | B2* | 2/2019 | Tai ........................ G02B 5/0263 |
| 11,143,809 | B2* | 10/2021 | Chiu .................... G02B 6/0036 |
| 2007/0058388 | A1* | 3/2007 | Takatori ............... G02B 6/0033 |
|  |  |  | 385/115 |
| 2009/0296406 | A1* | 12/2009 | Teng ..................... G02B 5/0278 |
|  |  |  | 362/339 |
| 2016/0334563 | A1* | 11/2016 | Chang ................. G02B 6/0036 |

FOREIGN PATENT DOCUMENTS

JP         2011022615 A     2/2011

* cited by examiner

*Primary Examiner* — Arman B Fallahkhair
(74) *Attorney, Agent, or Firm* — WPAT, PC

(57) ABSTRACT

The present invention provides a display device including a display panel, a backlight module, and a microstructure layer. The microstructure layer has a base layer and a plurality of microstructure groups. Each microstructure group includes: a central structure with a central trapezoidal section, a first structure with a first trapezoidal section, and a second structure with a second trapezoidal section arranged on a second side of the central structure. Based on the height of the central trapezoidal section, the legs of the first trapezoidal section and the second trapezoidal section facing away from the central structure are more inclined than the legs of the first trapezoidal section and the second trapezoidal section toward the central structure. The longer baselines of the central trapezoidal section, the first trapezoidal section, and the second trapezoidal section are all closer to the backlight module than the shorter upperlines.

24 Claims, 7 Drawing Sheets

DISPLAY DEVICE

BACKGROUND OF THE INVENTION

1. Field of the Invention

The invention generally relates to a display device. Particularly, the invention relates to a display device with a microstructure layer.

2. Description of the Prior Art

In today's society, display devices have gradually become popular in many fields. In order to improve the applicability of display devices in a diversity of fields, display devices with specific functions and light-emitting effects can be developed for various purposes. For example, in order to improve display viewing angles, some functional layers with the function of diffusing the display light have been developed to realize a wide viewing angle display device. However, while helping to expand the display viewing angle, it is difficult for this type of functional layer to maintain the front view brightness of the display device at the same time, or, while maintaining the front view brightness of the display device, it is difficult for this type of functional layer to expand the display viewing angle to make it wide enough. In addition, for specific application scenarios, a display device capable of displaying specific different viewing angles is also required. Therefore, there is a need to develop a display device that can improve or increase the display viewing angle while maintaining a certain degree of front view brightness.

SUMMARY OF THE INVENTION

To solve the abovementioned problems, according to the present invention, a display device is provided, which includes, a display panel, a backlight module disposed outside one surface of the display panel and configured to emit light toward the display panel and a microstructure layer disposed between the backlight module and the display panel. The microstructure layer has a base layer and multiple microstructure groups arranged in the base layer along a first direction and the surface of the base layer facing the backlight module. Furthermore, each microstructure group comprises a central structure, a first structure and a second structure, wherein the virtual section of the central structure in the first direction has a central trapezoidal section. The first structure is disposed on a first side of the central structure in the first direction, and has a first trapezoidal section on the virtual section. The second structure is disposed on a second side of the central structure opposite to the first side in the first direction, and has a second trapezoidal section on the virtual section. Based on the height of the central trapezoidal section, the legs of the first trapezoidal section and the second trapezoidal section facing away from the central structure are more inclined than the legs toward the central structure, and the longer baselines of the central trapezoidal cross section, the first trapezoidal cross section and the second trapezoidal cross section are all closer to the backlight module than the shorter upperlines.

Another embodiment of the present invention provides a vehicle central control display panel arranged between a front driver seat and a front passenger seat, which includes the abovementioned display device.

According to the display device or the vehicle central control display panel provided by the various embodiments of the present invention, the display viewing angle required for the application situation may be obtained while maintaining a certain level of front view brightness. For example, the display viewing angle may be enlarged, or it may be displayed for multiple viewing angles. In this way, the display viewing angle may be improved or increased, and at the same time the front view brightness reduction may be reduced or avoided, thereby realizing a display device or vehicle central control display panel with a multi-viewing or wide-angle viewing display and high brightness.

DETAILED DESCRIPTION OF THE PREFERRED EMBODIMENT

Various embodiments will be described below, and those with ordinary knowledge in the technical field should be able to easily understand the spirit and principle of the present invention by referring to the accompanying diagrams. However, although some specific embodiments will be specifically described in this specification, these embodiments are only exemplary, and are not regarded as restrictive or exhaustive in all respects. Therefore, for those with ordinary knowledge in the technical field, without departing from the spirit and principle of the present invention, various changes and modifications to the present invention should be obvious and easily reachable.

Figure 1:
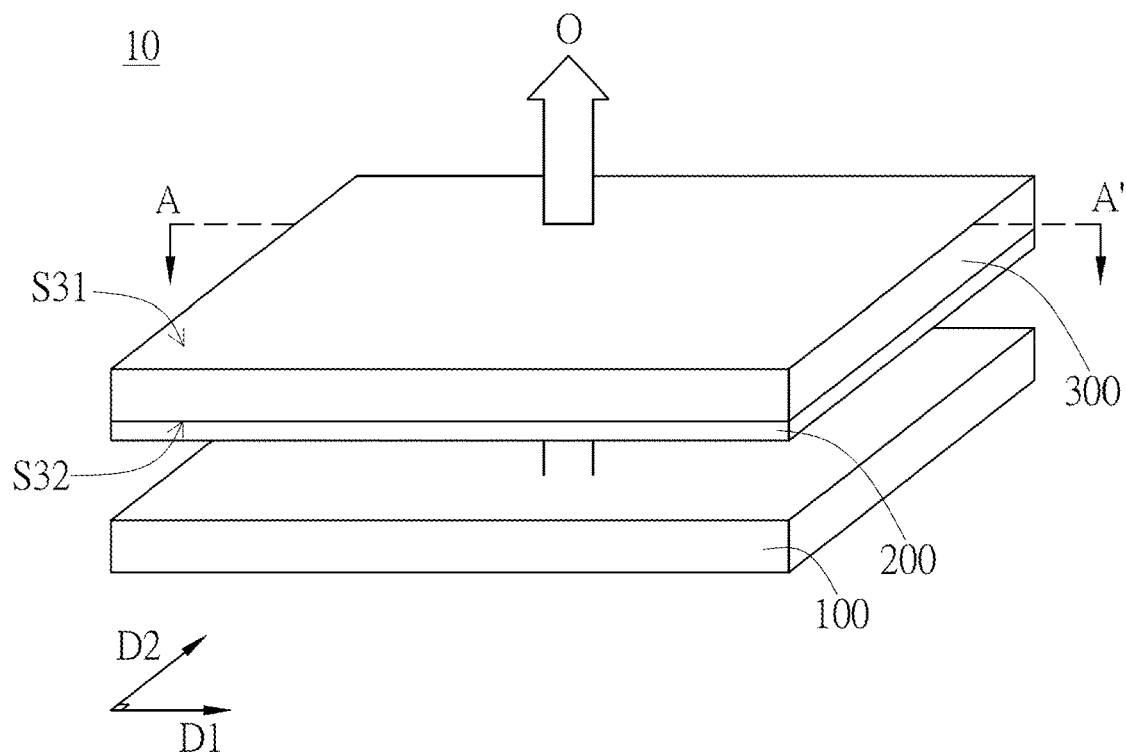
FIG. 1 is a three-dimensional schematic diagram of a display device with a microstructure layer according to the first embodiment of the present invention.

Please refer to FIG. 1. According to an embodiment of the present invention, a display device 10 is disclosed, which includes a display panel 300, a backlight module 100 disposed outside a surface (such as a surface S32) of the display panel 300, and a microstructure layer 200 disposed between the backlight module 100 and the display panel 300, wherein the backlight module 100 is configured to emit a light O toward the display panel 300 (for example, the light O is emitted toward the surface S32 of the display panel 300). Furthermore, the display panel 300 uses the light O provided by the backlight module 100 to display expected content from a surface S31 outward based on the element configuration and display mechanism therein.

Figure 2:
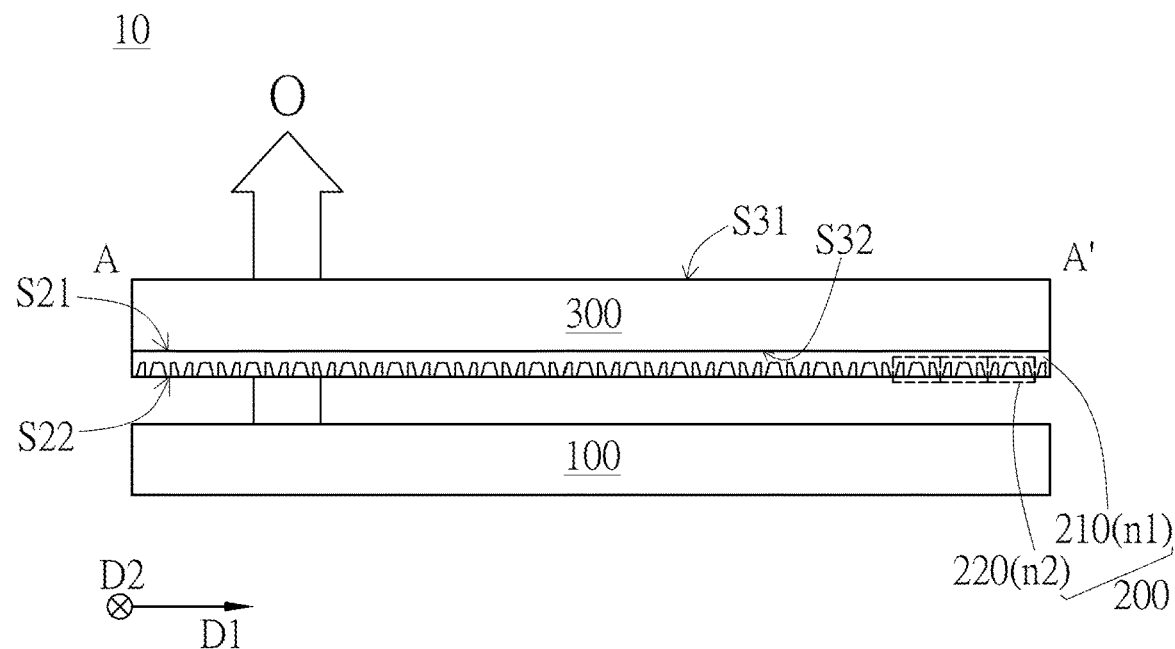
FIG. 2 is a sectional schematic diagram of the display device taken along the section line A-A' of FIG. 1 according to the second embodiment of the present invention.

According to an embodiment, in FIG. 1, the directions respectively parallel to the different sides of the display device 10 may be defined as a first direction D1 and a second direction D2. However, the above is only exemplary, the present invention is not limited thereto. For example, the first direction D1 and the second direction D2 may be any two directions perpendicular to each other that are parallel to the installation surfaces of the display device 10. In addition, FIG. 2 further shows a sectional schematic diagram taken along a section line A-A' parallel to the first direction D1 in FIG. 1. As shown in FIG. 2, in a virtual section taken along the section line A-A' of the first direction D1, the microstructure layer 200 has a base layer 210 and multiple microstructure groups 220 arranged in the base layer 210 along a surface S22 of the base layer 210 facing the backlight module 100 and along the first direction D1.

As described above, according to this embodiment, the multiple microstructure groups 220 may be formed relatively close to the surface S22 of the microstructure layer 200 facing the backlight module 100 instead of the surface S21 facing away from the backlight module 100. However, the present invention is not limited thereto. For example, the microstructure groups 220 may also be formed relatively close to the surface S21 of the microstructure layer 200 facing away from the backlight module 100.

The abovementioned multiple microstructure groups 220 may be formed in the base layer 210 based on various methods. For example, the base layer 210 may be embossed or etched to form a void with a predetermined shape, and then the material for forming the microstructure groups 220 is filled in the void, thereby forming the microstructure groups 220 built in the base layer 210. However, the above is only exemplary, and the present invention does not limit the method that may be used to form the microstructure groups 220.

In the microstructure layer 200, the base layer 210 may be formed of a material having a first refractive index n1, and the microstructure groups 220 may be formed of a material having a second refractive index n2, wherein the first refractive index n1 is greater than the second refractive index n2. For example, according to some embodiments, the ratio of the first refractive index n1 to the second refractive index n2 may be 1.06~1.13.

According to some embodiments, under the condition that satisfies the abovementioned relative relationship between the first refractive index n1 and the second refractive index n2, the absolute values of the first refractive index n1 and the second refractive index n2 are not particularly limited, and may be adjusted or changed according to available materials or the design of the display device 10. In addition, if additional layers or components are further provided on the side of the base layer 210 facing the display panel 300 or the side of the display panel 300 facing of the base layer 210 (for example, support layers or polarizers for support purposes), under the condition that satisfies the relative relationship between the first refractive index n1 and the second refractive index n2, the first refractive index n1 and the second refractive index n2 may also be set and adjusted independent of the refractive index of the material of the support layers or polarizers, without matching or being limited by the refractive index of the support layers or polarizers.

Figure 3:
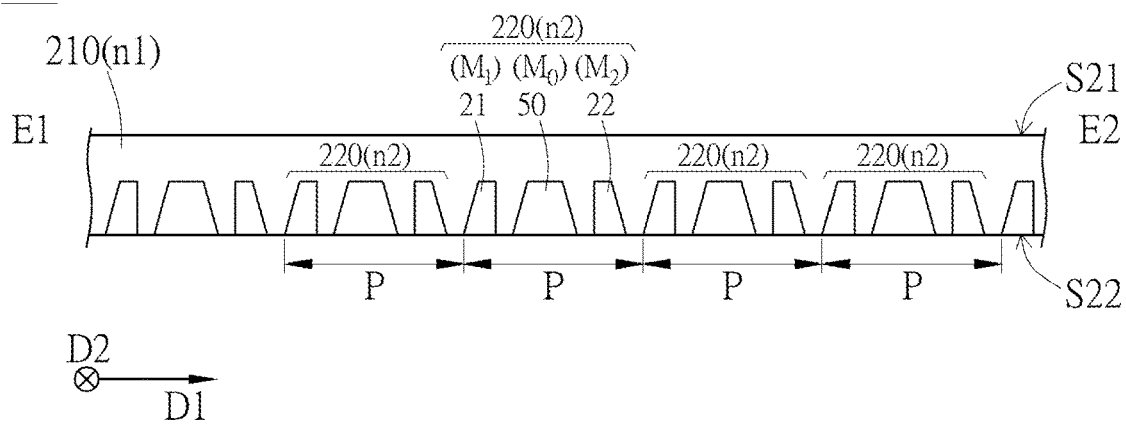
FIG. 3 is an enlarged schematic diagram of the microstructure layer in the display device of FIG. 2 according to the third embodiment of the present invention.

Please further refer to FIG. 3 which shows an enlarged schematic view of the microstructure layer 200 of FIG. 2. Each of the abovementioned microstructure groups 220 may include a central structure 50, a first structure 21 disposed on a first side E1 of the central structure 50 in the first direction D1, and a second structure 22 disposed on a second side E2 of the central structure 50 opposite to the first side E1 in the first direction D1. In addition, the virtual section of the central structure 50 in the first direction D1 has a central trapezoidal section M0; the first structure 21 has a first trapezoidal section M1 in the virtual section of the first direction D1; and the second structure 22 has a second trapezoidal section M2 on the virtual section in the first direction D1.

In this embodiment, in the abovementioned microstructure groups 220, the cross-sectional areas of the first trapezoidal section M1 and the second trapezoidal section M2 are both smaller than the cross-sectional area of the central trapezoidal section M0. Further, the first trapezoidal section M1 and the second trapezoidal section M2 may be arranged in a row relative to the central trapezoidal section M0 based on mirror symmetry. Specifically, according to some embodiments, the first trapezoidal section M1 and the second trapezoidal section M2 may have shapes that are the same as or similar to the right-angled trapezoidal shape, and the central trapezoidal section M0 may have the same or similar shape as the isosceles trapezoid. In addition, the two symmetrical legs (i.e. side edges) of the central trapezoidal section M0 may face the first trapezoidal section M1 and the second trapezoidal section M2, respectively, and the legs of the first trapezoidal section M1 and the second trapezoidal section M2 that are perpendicular or nearly perpendicular to the baselines may be disposed relatively close to the central trapezoidal section M0. Based on this configuration, excluding slight differences caused by factors such as process tolerances, the first structure 21 and the second structure 22 may be substantially symmetrical or mirror-symmetrical relative to the central structure 50. It must be noted that the surfaces of the above structures may not be completely flat due to factors such as manufacturing process, but they are still within the scope of the above description.

According to some embodiments, depending on the manufacturing process, the display device 10 may include truncated and incomplete microstructure groups 220 at the edges. For example, the first structure 21 may be missing. In addition, the abovementioned central structure 50, the first structure 21 and the second structure 22 may respectively extend in a strip shape in a second direction D2 perpendicular to the first direction D1. That is, according to some embodiments of the present invention, the central structure 50, the first structure 21 and the second structure 22 of each microstructure groups 220 may be substantially strip-like structures extending along the second direction D2 along the surface of the base layer 210. Moreover, the virtual section in the first direction D1 has a trapezoidal shape. The abovementioned first structure 21 and the second structure 22 may be arranged symmetrically with respect to the central structure 50, and multiple microstructure groups 220 may be repeatedly arranged and distributed along the first direction D1.

Figure 4:
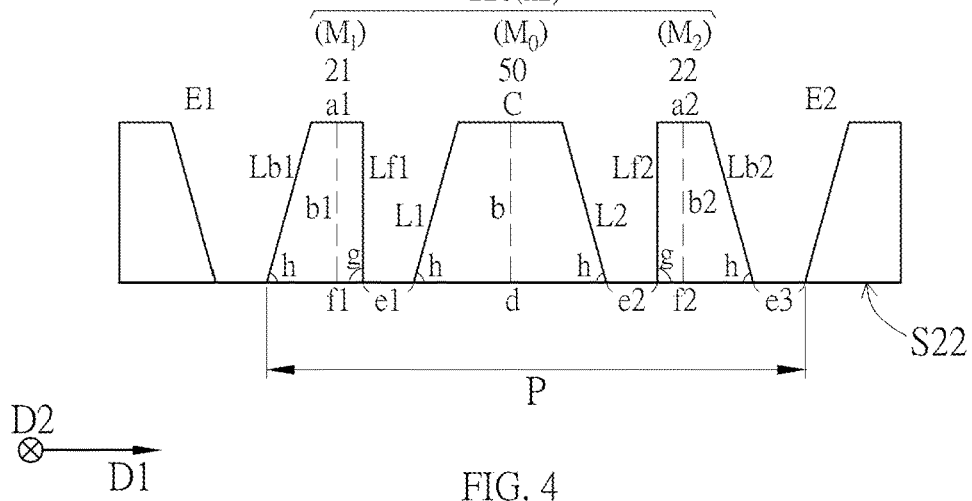
FIG. 4 is an enlarged schematic diagram of the shape and arrangement of a central structure, a first structure and a second structure of each microstructure group in the microstructure layer according to the fourth embodiment of the present invention.

Next, this article will further exemplify the specific dimensions, angles, proportions, and configurations of the central trapezoidal section M0, the first trapezoidal section M1, and the second trapezoidal section M2 with reference to FIG. 4 which shows each microstructure groups 220 enlarged.

Continuing from the above, please refer to FIG. 4 and FIG. 3. The central trapezoidal section M0 may have a shorter upperline c and a longer baseline d. The first trapezoidal section M1 may have a shorter upperline a1 and a longer baseline f1. The second trapezoidal section M2 may have a shorter upperline a2 and a longer baseline f2. In addition, the central trapezoidal section M0 may have a height b. The first trapezoidal section M1 may have a height b1, and the second trapezoidal section M2 may have a height b2, wherein the baselines d, f1, and f2 of the central trapezoidal section M0, the first trapezoidal section M1 and the second trapezoidal section M2, respectively, may be aligned with the surface S22 of the base layer 210 facing the backlight module 100, and the upperlines c, a1, and a2 of the central trapezoidal section M0, the first trapezoidal section M1 and the second trapezoidal section M2, respectively, may be formed in the base layer 210 and relatively close to the display panel 300.

According to some embodiments, the central trapezoidal section M0 may substantially have two legs L1 and L2 inclined at the same angle and with the same length. Besides, the first trapezoidal section M1 that is the same or similar to the right-angled trapezoidal shape may have a leg Lf1 relatively close to the central trapezoidal section M0 and a leg Lb1 relatively far away from the central trapezoidal section M0. In addition, the second trapezoidal section M2 that is the same or similar to the right-angled trapezoidal shape may have a leg Lf2 relatively close to the central trapezoidal section M0 and a leg Lb2 relatively far away from the central trapezoidal section M0.

Continuing from the above, in some embodiments, since the first trapezoidal section M1 and the second trapezoidal section M2, which are substantially the same or similar to a right-angled trapezoidal shape, may be arranged in a symmetrical or manner with respect to the central trapezoidal section M0, based on the height b of the central trapezoidal section M0, the legs Lb1 and Lb2 of the first trapezoidal section M1 and the second trapezoidal section M2 facing away from the central structure 50 may be more inclined than the legs Lf1 and Lf2 toward the central structure 50, respectively. That is, according to this embodiment, the legs Lf1 and Lf2 of the first trapezoidal section M1 and the second trapezoidal section M2 arranged symmetrically or mirror-symmetrically near the central structure 50 may be arranged perpendicular to or close to perpendicular to the surface S22 of the base layer 210, and the legs Lb1 and Lb2 facing away from the central structure 50 are substantially arranged relatively obliquely. With this setting, the diffusion angle range of the light that can maintain a certain brightness or energy after passing through the microstructure layer 200 may be improved or maintained.

According to the present embodiment, the respective longer baselines d, f1, and f2 of the central trapezoidal section M0, the first trapezoidal section M1, and the second trapezoidal section M2 are close to the backlight module 100 with respect to the respectively shorter upperlines c, a1, and a2. That is, the trapezoidal section of the microstructure groups 220 in the microstructure layer 200 may be a trapezoidal shape that tapers from the backlight module 100 toward the display panel 300, and their respective heights (e.g. height b, b1, b2) may be substantially perpendicular to the surface S22 of the base layer 210. In addition, according to some embodiments, the height b, 131 and b2 of the central trapezoidal section M0, the first trapezoidal section M1 and the second trapezoidal section M2 may be substantially the same. Additionally, according to other embodiments, the ratio of the respective heights 131 and b2 of the first trapezoidal section M1 and the second trapezoidal section M2 to the height b of the central trapezoidal section M0 may be between 0.9 and 1.1.

In addition, according to some embodiments, the heights b, 131 and b2 of the central trapezoidal section M0, the first trapezoidal section M1 and the second trapezoidal section M2 are greater than the widths of respective baselines d, f1 and f2 of the central trapezoidal section M0, the first trapezoidal section M1 and the second trapezoidal section M2. In detail, the central trapezoidal section M0, the first trapezoidal section M1 and the second trapezoidal section M2 may be formed into relatively slender elongated trapezoids. For example, according to some embodiments, the ratio of the height b of the central trapezoidal section M0 to the width of the baseline d of the central trapezoidal section M0 may be 1.4 to 1.8.

The aforementioned microstructure groups 220 (including the first structure 21, the central structure 50, and the second structure 22) occupy a pitch P in the virtual section along the first direction D1, which may be between 10 μm and 100 μm. Specifically, as shown in FIG. 3 and FIG. 4, in the virtual section of each microstructure groups 220 along the first direction D1, the sum of the width of the baseline f1 of the first trapezoidal section M1, the gap e1 between the baseline f1 of the first trapezoidal section M1 and the baseline d of the central trapezoidal section M0, the width of the baseline d of the central trapezoidal section M0, the gap e2 between the baseline d of the central trapezoidal section M0 and the baseline f2 of the second trapezoidal section M2, the width of the baseline f2 of the second trapezoidal section M2, and the gap e3 between the bassline f2 of the second trapezoidal section M2 and the baseline f1 of the first trapezoidal section M1 of another adjacent microstructure groups may be defined as a distance P between a microstructure group 220, and the distance P may be between 10 μm and 100 μm.

Furthermore, in some embodiments, the ratio of the sum of the width of the upperline c of the central trapezoidal section M0, the width of the upperline a1 of the first trapezoidal section M1, the width of the upperline a2 of the second trapezoidal section M2, and all the gaps e1, e2 and e3 to the pitch P occupied by each microstructure group 220 is ≥0.45. That is, the sum of all the widths of the upperlines of all the structures of the microstructure groups 220 and all the gaps sandwiched between the baselines of each structure may be greater than 45% or more of the pitch P occupied by each unit of the microstructure groups 220. As mentioned above, based on this configuration ratio, the brightness or energy of the front viewing angle that may be maintained after the light passes through the microstructure layer 200 of this embodiment may be further improved or maintained.

In addition, according to another embodiment of the present invention, the relative difference among the first gap e1 between the baseline f1 of the first trapezoidal section M1 and the baseline d of the central trapezoidal section M0, the second gap e2 between the baseline d of the central trapezoidal section M0 and the baseline f2 of the second trapezoidal section M2, and the third gap e3 between the first trapezoidal section M1 and the second trapezoidal section M2 of the adjacent microstructure group 220 is not more than 20%. For example, the ratio of the first gap e1 to the second gap e2 may be between 0.9 and 1.1 and the ratio of the third gap e3 to the second gap e2 may be between 0.9 and 1.1. Further, according to some embodiments of the present invention, the first gap e1, the second gap e2, and the third gap e3 may be substantially the same.

Furthermore, according to other embodiments of the present invention, the ratio of the width of the upperline c of the central trapezoidal section M0 to the first gap e1 or the second gap e2 may be between 0.4 and 3. On the other hand, the ratio of the widths of the baselines f1 and f2 of the first trapezoidal section M1 and the second M2 to the width of the baseline d of the central trapezoidal section M0 may be 0.45~0.55. Besides, the ratio of the widths of the upperlines a1 and a2 of the first trapezoidal section M1 and the second trapezoidal section M2 to the width of the upperline c of the central trapezoidal section M0 may be 0.45~0.55. For example, the upperlines and baselines of the first trapezoidal section M1 may be half of the upperlines and baselines of the central trapezoidal section M0, and the upperlines and baselines of the second trapezoidal section M2 may be half of the upperlines and baselines of the central trapezoidal section M0. However, the description mentioned above is only exemplary and the present invention is not limited thereto.

As mentioned above, the central trapezoidal section M0 may substantially have an isosceles trapezoid shape, wherein the bottom angle h between the leg L1 or L2 of the central trapezoidal section M0 relative to the baseline d of the central trapezoidal section M0 may be between 75°~80°. In addition, the bottom angle h between the legs Lb1 and Lb2 of the first trapezoidal section M1 and the second trapezoidal section M2 facing away from the central structure 50 and the baselines f1 and f2 of the first trapezoidal section M1 and the second trapezoidal section M2 may also be between 75° and 80°. In addition, the bottom angle g between the legs Lf1 and Lf2 of the first trapezoidal section M1 and the second trapezoidal section M2 facing toward the central structure 50 and the baselines f1 and f2 of the first trapezoidal section M1 and the second trapezoidal section M2 may also be between 80° and 90°. In detail, according to an embodiment, the bottom angle g may be substantially vertical 90° after removing the process tolerances.

According to some embodiments, the first trapezoidal section M1 and the second trapezoidal section M2 are arranged in a symmetrical or mirror-symmetrical manner with respect to the central trapezoidal section M0, and they may essentially be trapezoidal sections with the same size, angle and shape. However, the present invention is not limited thereto. In addition, based on the consideration of manufacturing process tolerances or other structural constraints, the size, angle and shape of the first trapezoidal section M1 and the second trapezoidal section M2 may also have some differences within the scope that meets the above conditions.

Next, a microstructure layer 200' according to another embodiment of the present invention will be further explained with reference to FIG. 5. Specifically, the same or similar details as the abovementioned microstructure layer 200 will be omitted or only briefly mentioned.

Figure 5:
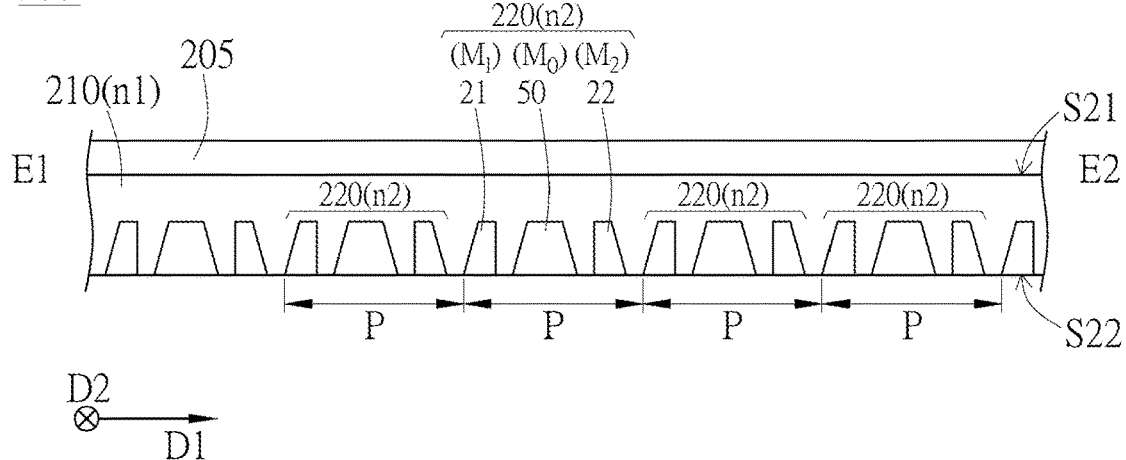
FIG. 5 is an enlarged schematic diagram of the microstructure layer in the display device according to the fifth embodiment of the present invention.

As shown in FIG. 5, the microstructure layer 200' may further include a support layer 205. The support layer 205 is disposed on the surface of the base layer 210 facing the display panel 300 and configured to support the base layer 210 and the microstructure groups 220 arranged in the base layer 210. Specifically, according to an embodiment of the present invention, the support layer 205 may be formed on the surface of the display panel 300 facing the backlight module 100, and, based on the support of the support layer 205, the base layer 210 and multiple microstructure groups 220 are further formed and molded thereon. Additionally, according to another embodiment of the present invention, it is also possible to form the support layer 205 first, and then based on the support of the support layer 205, the base layer 210 and multiple microstructure groups 220 may be further formed and molded thereon. Then, the completed microstructure layer 200' and the display panel 300 are attached, for example, through gluing, etc. However, in the aspect of laying and molding the microstructure layer 200' directly on the surface of the display panel 300 opposite to the backlight module 100, the supporting layer 205 may also be omitted. The present invention is not limited thereto.

Figure 6:
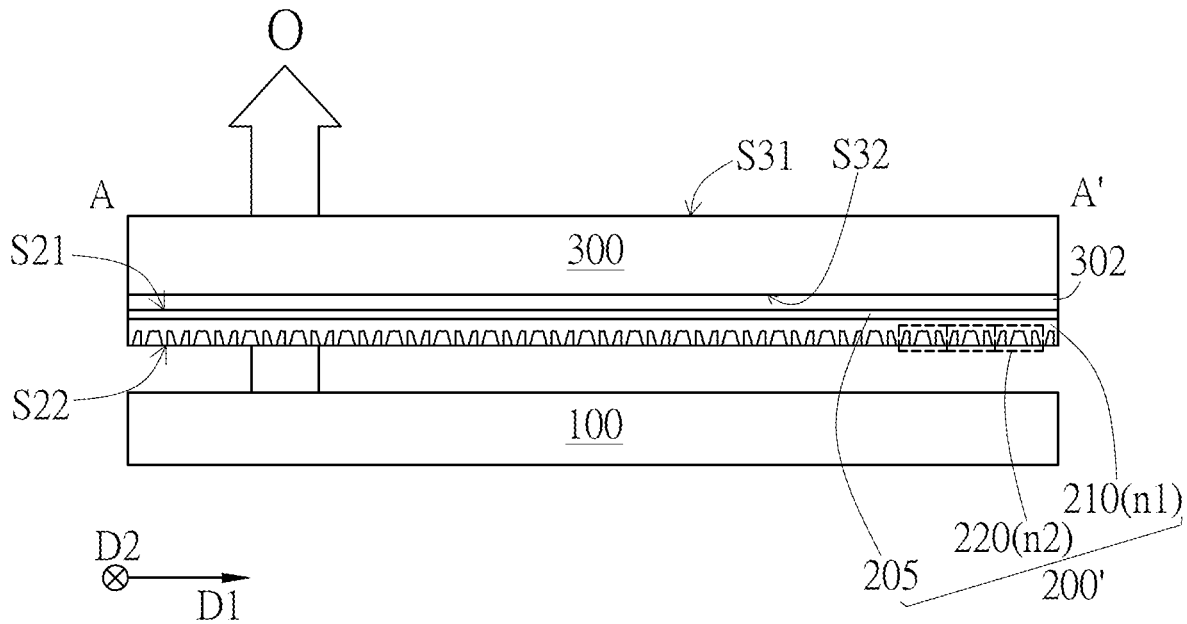
FIG. 6 is a sectional schematic diagram of the display device according to the sixth embodiment of the present invention.

In addition, as shown in FIG. 6, a display device 20 according to another embodiment may further include a polarizer 302 disposed between the display panel 300 and the microstructure layer 200', and the microstructure layer 200' may be directly formed on the lower polarizer 302 as described above or attached to the lower polarizer 302 after completion. Besides, with the lower polarizer 302, according to some embodiments of the present invention, the support layer 205 and the lower polarizer 302 may be formed of the same material, or the support layer 205 and the lower polarizer 302 may have refractive indexes that are less than 20% relative to each other instead. For example, the support layer 205 and the lower polarizer 302 may both be made of cellulose triacetate (cellulose triacetate or tri-acetyl cellulose, TAC for short), or the support layer 205 and the lower polarizer 302 may both be made of materials with a refractive index of 1.5. Thereby, the light passing through the support layer 205 and the lower polarizer 302 in sequence will not substantially change its optical properties. However, the materials and refractive index shown above are merely exemplary. The present invention is not limited thereto.

Figure 7:
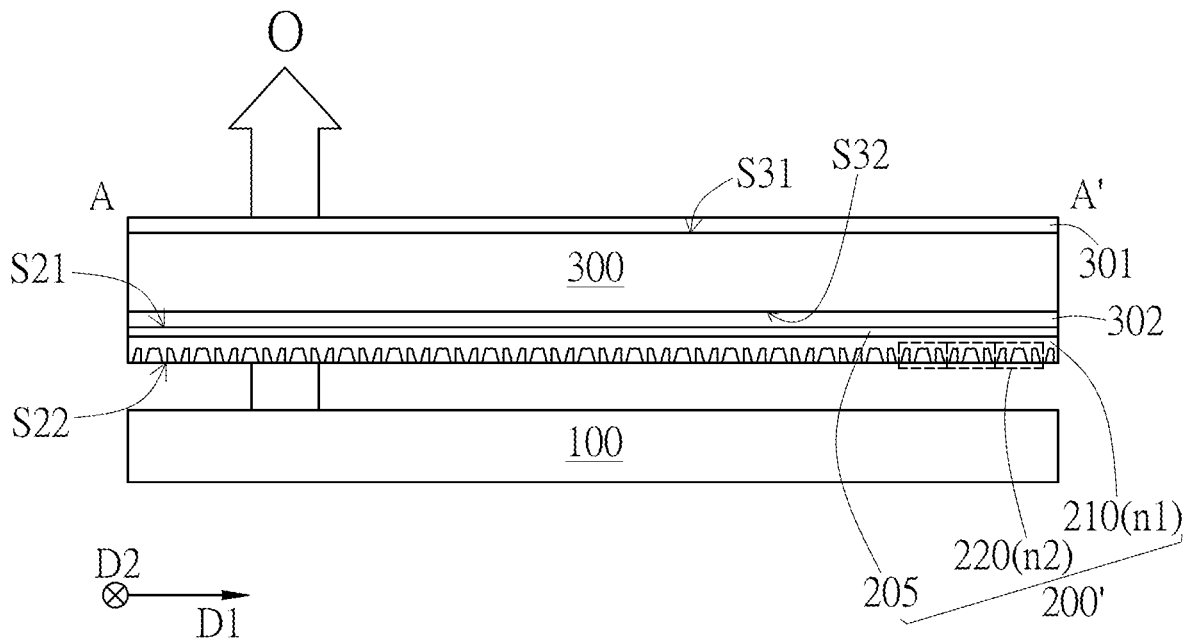
FIG. 7 is a sectional schematic diagram of the display device according to the seventh embodiment of the present invention.

Next, please further refer to a display device 30 according to another embodiment of the present invention in FIG. 7. In addition to the lower polarizer 302 disposed between the microstructure layer 200' and the display panel 300, an upper polarizer 301 may be further disposed on a surface of the display panel 300 facing away from the backlight module 100, such as the surface S31. That is, the microstructure layer 200' according to the various embodiments of the present invention may be used in conjunction with the optional upper polarizer 301 and the lower polarizer 302, and the microstructure layer 200' may be relatively disposed on one surface of the lower polarizer 302 facing the backlight module 100. In addition, although the microstructure layer 200' with the support layer 205 is shown in these embodiments, other microstructure layers 200 without the support layer 205 may be optionally replaced in these embodiments. As mentioned above, those with ordinary knowledge in the technical field should understand that these substitutions should all belong to the scope of different embodiments of the present invention, and it will not be repeated.

Figure 8:
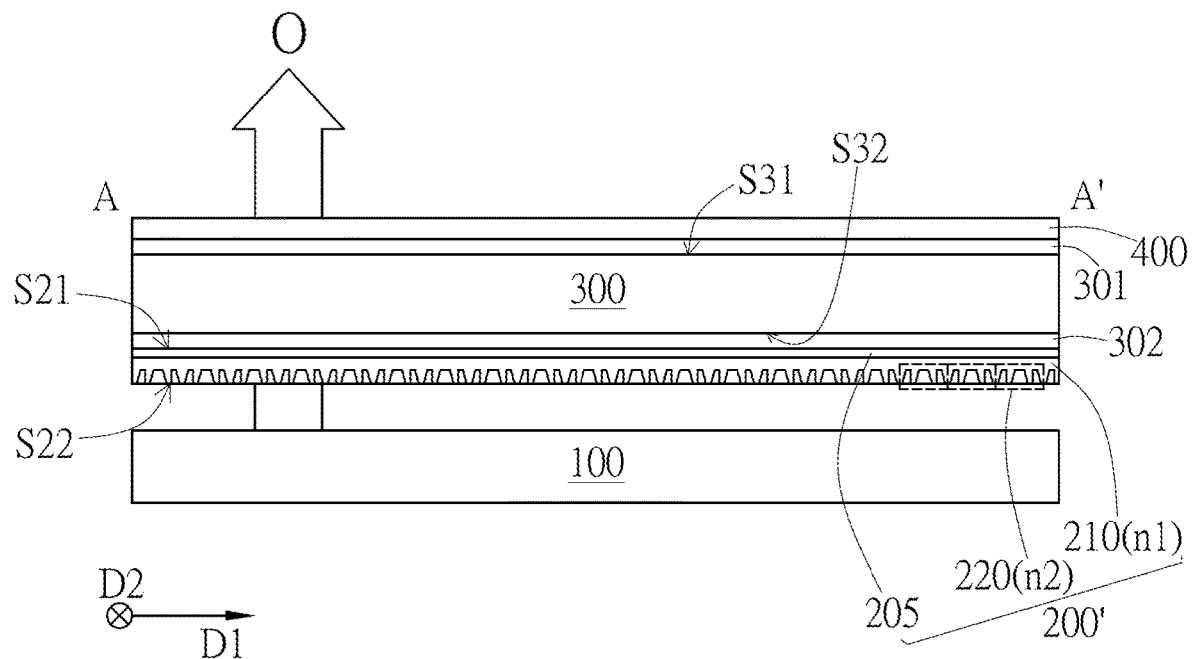
FIG. 8 is a sectional schematic diagram of the display device according to the eighth embodiment of the present invention.

Furthermore, please refer to FIG. 8. As shown in FIG. 8, a display device 40 according to another embodiment of the present invention has the same configuration as the abovementioned display device 30, and the difference is that the display device 40 further includes an anti-glare layer 400 disposed on a surface of the display panel 300 facing away from the backlight module 100, such as the surface S31. For example, the display device 40 may further include the anti-glare layer 400 with an anti-glare function disposed on the side of the upper polarizer 301 facing away from the display panel 300. In some embodiments, the haze of the anti-glare layer 400 may be between 40% and 90%. For example, the haze of the anti-glare layer 400 may be between 60% and 80%.

Continuing from the above, regardless whether the upper polarizer 301 and/or the lower polarizer 302 is configured, under the configuration of the microstructure layer 200 or 200' of the present invention, according to whether the anti-glare layer 400 is further configured, different light field-type display effects may be realized. For example, the light-emitting field patterns respectively generated by the display device 30 and the display device 40 of the embodiment shown in FIGS. 7 and 8 correspond to the light-emitting field patterns shown in FIGS. 9A and 9B, respectively. In detail, the display device 30 (FIG. 7) and the display device 40 (FIG. 8) are both provided with a microstructure layer 200', and the difference is that the display device 40 (FIG. 8) further has the anti-glare layer 400.

Figure 9A:
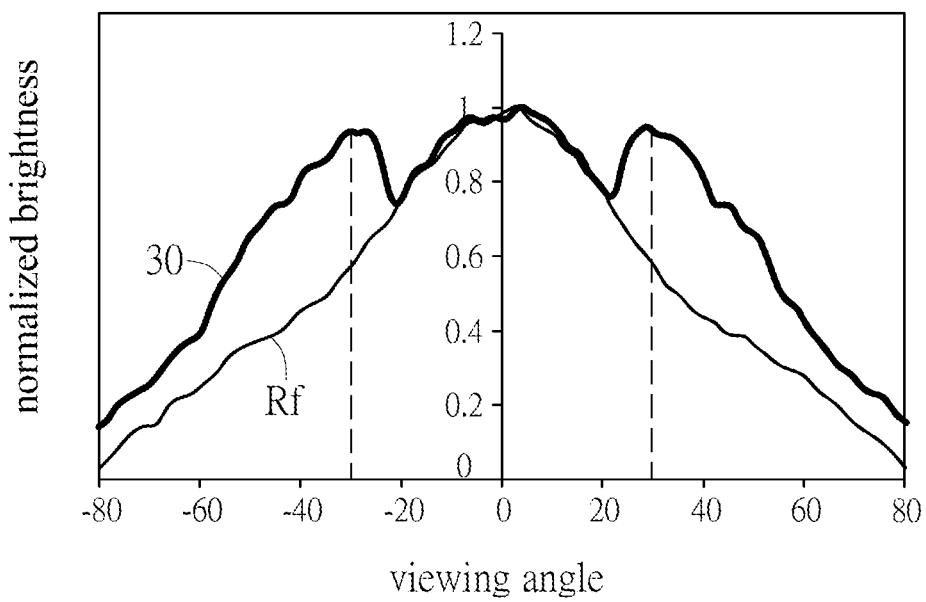
FIG. 9A and FIG. 9B are schematic diagrams showing changes in the light field shape of the display device constructed according to the ninth embodiment and the tenth embodiment of the present invention to increase or expand the display viewing angle.

As shown in FIG. 9A, using the same structure, a reference datum display device Rf without the microstructure layer 200' may have a single-peak narrow viewing angle light field type in which the front viewing angle is brighter and the brightness on both sides decreases as the viewing angle increases, wherein the viewing angle which may maintain the brightest brightness above 80% is within plus or minus 19°. That is, without the microstructure layer 200', the reference datum display device Rf may have a brightness of more than 80% within a viewing angle of plus or minus 19° (the relative brightest brightness is standardized to 1).

Continuing to refer to FIG. 9A, on the other hand, using the same architecture, the display device 30 with a microstructure layer 200' may have a front viewing angle, and a three-peak multi-view light field type with brighter performance in the specific viewing angle range (approximately corresponding to a viewing angle of 30°) on both sides, wherein the viewing angle that may maintain above 80% of the brightest brightness (relative to the brightest brightness is normalized to 1) may be further extended to three sections within 35° of viewing angle.

Figure 9B:
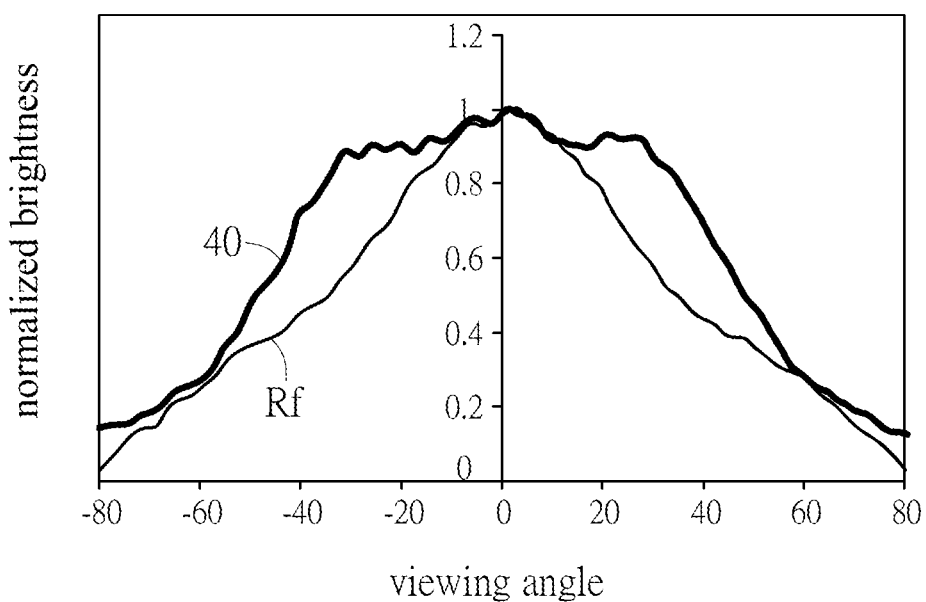

Similarly, please refer to FIG. 9B again. FIG. 9B also shows the reference datum display device Rf without the microstructure layer 200', and this has been explained in detail in the corresponding paragraph of FIG. 9A above, and it will not be repeated here. On the other hand, in FIG. 9B, it is further shown that using the same structure, the display device 40 provided with the microstructure layer 200' and the anti-glare layer 400 may have a single-peak wide viewing angle light field type with a further enlarged viewing angle, wherein the viewing angle that may maintain above 80% of the brightest brightness (relative brightest brightness is normalized to 1) may be further extended to about 35°.

As described above, through different embodiments of the present invention, when the microstructure layer 200' (or similarly with the microstructure layer 200) is provided, the viewing angle with high brightness may be increased or expanded. Particularly, if the anti-glare layer 400 is provided in a general display device, the display viewing angle may be greatly reduced and the display quality may be degraded. However, based on the configuration of the various embodiments of the present invention, by adding the microstructure layer 200' (or similarly the microstructure layer 200), the viewing angle reduction caused by the configuration of the anti-glare layer 400 may be greatly reduced, avoided or improved, and based on the configuration of the anti-glare layer 400, display devices with different display viewing angle effects may be developed for different application scenarios.

Figure 10:
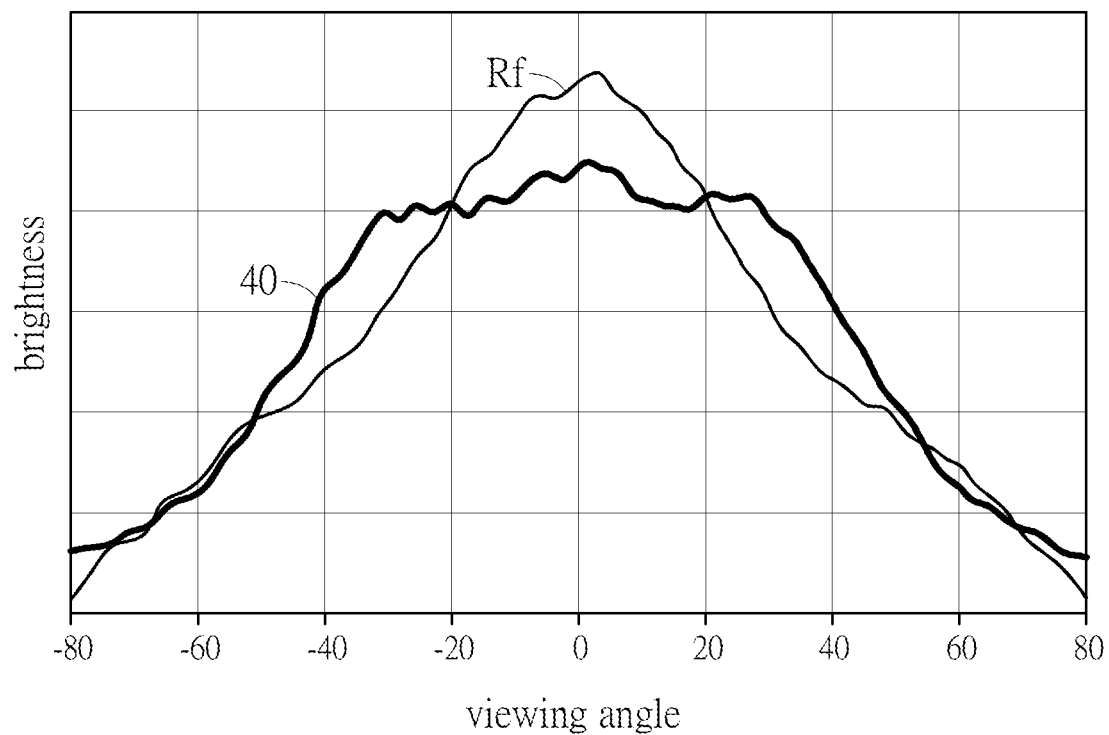
FIG. 10 is a schematic diagram of the display viewing angle and front view brightness of a display device with the microstructure layer and an anti-glare layer according to the eleventh embodiment of the present invention compared to the same for a display device without the microstructure layer and an anti-glare layer.

Next, please refer to FIG. 10, which further shows the change and adjustment of the actual brightness and viewing angle after the microstructure layer 200' (or similarly with the microstructure layer 200) and the anti-glare layer 400 are configured, compared with the reference datum display device Rf of the same structure without the microstructure layer 200' and the anti-glare layer 400.

In addition, FIG. 10 shows the light field types generated respectively by the reference datum display device Rf, whose brightness is not further standardized, and the display device 40 according to an embodiment of the present invention. As shown in FIG. 10, using the same structure, after further installing the microstructure layer 200' (or similarly with the microstructure layer 200) and the anti-glare layer 400, the maximum brightness reduction of the light field type generated by the display device 40 is no less than 16% and the viewing angle with a brightness of more than 80% of the maximum brightness of the front view may be expanded to 35°. Therefore, it is possible to obtain a high brightness viewing angle with a relatively large gain (an 84% increase in viewing angle) under a relatively low-loss front view brightness (only a reduction of <16% of the front view brightness), thereby realizing a wide viewing angle display device 40.

Next, the application context or environment of the display device according to some embodiments of the present invention is further explained in the following.

Figure 11:
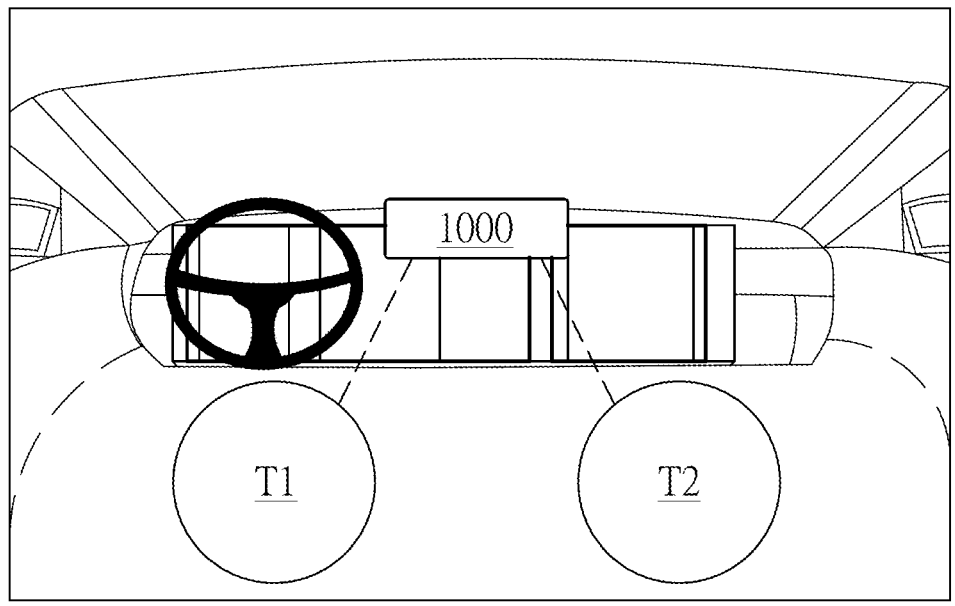
FIG. 11 is a schematic diagram of the application scenario of a vehicle central control display panel according to the eleventh embodiment of the present invention.

In addition, referring to FIG. 11, according to an embodiment of the present invention, a vehicle central control display panel 1000 arranged between the front driver seat T1 and the front passenger seat T2 is further provided. The vehicle central control display panel 1000 may include the display device (e.g., display devices 10-30) of any embodiment of the present invention that does not include the anti-glare layer 400 as described above. In this embodiment, since the vehicle central control display panel 1000 has the microstructure layer 200/200' but does not have the anti-glare layer 400, a multi viewing display effect may be presented, and it may be applied to display the viewing angle of the front driver seat T1 and the front passenger seat T2 respectively. In this way, the single vehicle central control display panel 1000 may be used to display objects sitting in different positions, or to improve the display effect and brightness of the display content received by objects sitting in different positions. However, in different embodiments, the anti-glare layer 400 may also be added to the vehicle central control display panel 1000 to form a wide viewing angle display effect.

Figure 12:
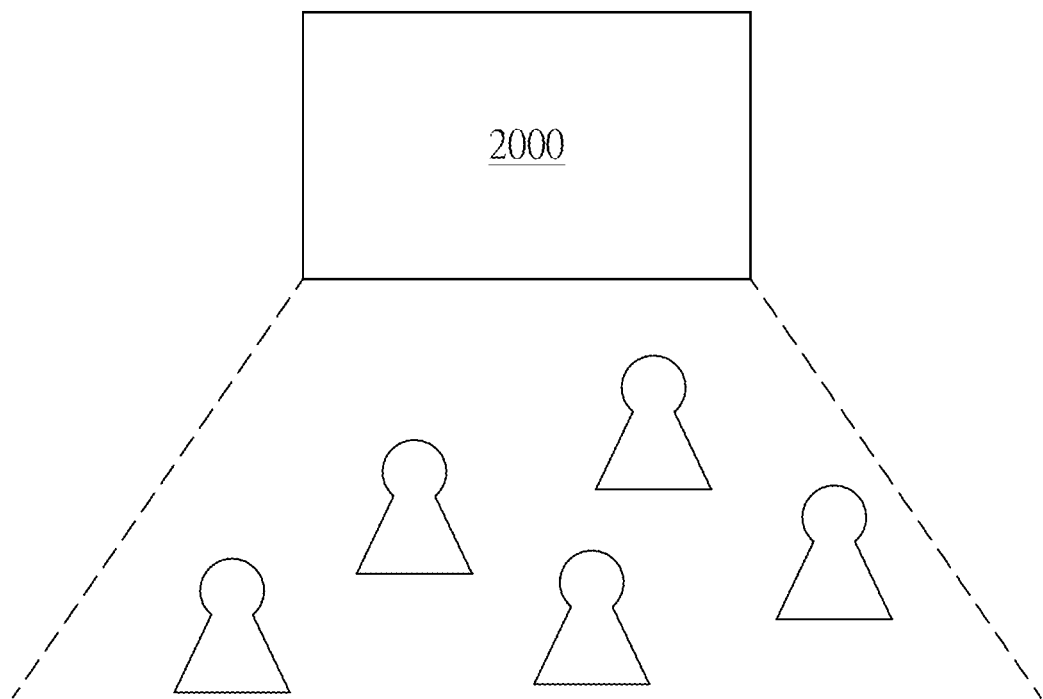
FIG. 12 is a schematic diagram of the application scenario of the display device according to the twelfth embodiment of the present invention.

Furthermore, referring to FIG. 12, a wide viewing angle display device 2000 is further provided according to another embodiment of the present invention. The wide viewing angle display device 2000 may include the display device (such as the display device 40) of any embodiment of the present invention including the anti-glare layer 400 as described above. In this embodiment, since the wide viewing angle display device 2000 has the microstructure layer 200/200' and also has the anti-glare layer 400, it may present a wide viewing angle display effect, and may be used to display unspecified objects and angles within a certain viewing angle range. In this way, the single wide viewing angle display device 2000 may be used to display objects located at different positions, or to improve the display effect and brightness of the displayed content received by objects at different positions. In addition, the wide viewing angle display device 2000 may be further applied to devices whose viewing angles and positions may vary relatively greatly or are more flexible. For example, it may be installed on a TV set in the living room for the whole family to enjoy.

The application scenarios and aspects described above with reference to FIG. 11 and FIG. 12 are only exemplary. The present invention is not limited thereto. In addition, those with ordinary knowledge in the technical field should understand that the applicable environment or situation may be adjusted according to the light field type and brightness generated by the display device of each embodiment of the present invention.

In summary, the display device and the vehicle central control display panel disclosed according to various embodiments of the present invention may increase or expand the viewing angle with high brightness while maintaining a certain degree of high front view brightness, so that multiple objects in specific or nonspecific positions may be viewed. Particularly, the microstructure layer disposed between the backlight module and the display panel will not affect the appearance of the overall display device and the car central control display panel, and may maintain the surface roughness and/or the appearance of the display device and the vehicle central control display panel. Furthermore, when paired with other optical components such as anti-glare film, it may also reduce or avoid the reduction of the high brightness viewing angle, and even change and adjust the light field type, thereby improving the applicability of display devices and vehicle central control display panels for various situations.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A display device comprising: a display panel; a backlight module disposed opposite to a surface of the display panel and configured to emit light toward the display panel; and a microstructure layer disposed between the backlight module and the display panel, wherein the microstructure layer has: a base layer; and a plurality of microstructure groups arranged in the base layer along a surface of the base layer facing the backlight module and along a first direction, wherein each microstructure group includes: a central structure having a central trapezoidal section in the first direction; a first structure disposed on a first side of the central structure in the first direction and has a first trapezoidal section; a second structure disposed on a second side of the central structure opposite to the first side in the first direction, and has a second trapezoidal section; wherein, based on the height of the central trapezoidal section, the legs of the first trapezoidal section and the second trapezoidal section facing away from the central structure are more inclined than the legs of the first trapezoidal section and the second trapezoidal section facing toward the central structure, and longer base lines of the central trapezoidal cross section, the first trapezoidal cross section and the second trapezoidal cross section are all closer to the backlight module than shorter upper lines of the central trapezoidal cross section, the first trapezoidal cross section and the second trapezoidal cross section.

2. The display device according to claim 1 further comprising an anti-glare layer disposed on a surface of the display panel facing away from the backlight module.

3. The display device according to claim 2, wherein a haze of the anti-glare layer is between 40%~90%.

4. The display device according to claim 3, wherein the haze of the anti-glare layer is between 60%~80%.

5. The display device according to claim 1, wherein the heights of the central trapezoidal section, the first trapezoidal section and the second trapezoidal section are substantially the same, or the ratios of the respective heights of the first trapezoidal section and the second trapezoidal section to the height of the central trapezoidal section are between 0.9 and 1.1, wherein: the heights of the central trapezoidal section, the first trapezoidal section and the second trapezoidal section are greater than the widths of respective base lines of the central trapezoidal section, the first trapezoidal section and the second trapezoidal section.

6. The display device according to claim 5, wherein the ratio of the height of the central trapezoidal section to the width of the base line of the central trapezoidal section is 1.4 to 1.8.

7. The display device according to claim 1, wherein the microstructure layer further includes a support layer disposed on the surface of the base layer facing the display panel and configured to support the base layer and the microstructure groups arranged in the base layer.

8. The display device according to claim 7 further comprising a polarizer disposed between the display panel and the microstructure layer, wherein:
the support layer and the lower polarizer are formed of the same material, or a difference between refractive indexes of the support layer and the lower polarizer is less than 20% relative to each of the refractive indexes.

9. The display device according to claim 1, wherein in the of each microstructure group along the first direction, the ratio of the sum of the width of the upper line of the central trapezoidal section, the width of the upper line of the first trapezoidal section, the width of the upper line of the second trapezoidal section and the width of all gaps between the central trapezoidal section, the first trapezoidal section and the base line of the second trapezoidal section to the pitch occupied by each microstructure group is equal or greater than 0.45.

10. The display device according to claim 9, wherein the pitch occupied by each microstructure group is between 10 μm and 100 μm.

11. The display device according to claim 1, wherein the base layer is formed of a material having a first refractive index, and the microstructure groups are formed of a material having a second refractive index, wherein:
the first refractive index is greater than the second refractive index.

12. The display device according to claim 11, wherein the ratio of the first refractive index to the second refractive index is between 1.06~1.13.

13. The display device according to claim 1, wherein the relative differences among a first gap between the base line of the first trapezoidal section and the base line of the central trapezoidal section, a second gap between the base line of the central trapezoidal section and the base line of the second trapezoidal section, and a third gap between the first trapezoidal section and the second trapezoidal section of the adjacent microstructure group are equal or less than 20%.

14. The display device according to claim 13, wherein the ratio of the width of the upper line of the central trapezoidal section to the first gap or the second gap is between 0.4 and 3.

15. The display device according to claim 1, wherein the central trapezoidal section has an isosceles trapezoid shape.

16. The display device according to claim 1, wherein the first trapezoidal section and the second trapezoidal section is arranged in a row relative to the central trapezoidal section based on mirror symmetry.

17. The display device according to claim 1, wherein the cross-sectional areas of the first trapezoidal section and the second trapezoidal section are both smaller than the cross-sectional area of the central trapezoidal section.

18. The display device according to claim 1, wherein the base lines of the central trapezoidal section, the first trapezoidal section and the second trapezoidal section, respectively, is aligned with the surface of the base layer facing the backlight module.

19. The display device according to claim 1, wherein the central structure, the first structure and the second structure respectively extend in a strip shape in a second direction perpendicular to the first direction.

20. The display device according to claim 1, wherein the bottom angle between the leg of the central trapezoidal section and its base line is between 750~80.

21. The display device according to claim 1, wherein the bottom angle between the legs of the first trapezoidal section and the second trapezoidal section facing away from the central structure and the respective base lines of the first trapezoidal section and the second trapezoidal section are respectively be between 750 and 800.

22. The display device according to claim 1, wherein the bottom angle between the legs of the first trapezoidal section and the second trapezoidal section facing toward the central structure and the respective base lines of the first trapezoidal section and the second trapezoidal section is respectively between 800 and 900.

23. The display device according to claim 1, wherein the ratios of the widths of the respective base lines of the first trapezoidal section and the second trapezoidal section to the width of the base line of the central trapezoidal section are between 0.45~0.55, and the ratio of the widths of the respective upper lines of the first trapezoidal section and the second trapezoidal section to the width of the upper line of the central trapezoidal section are between 0.45~0.55.

24. A vehicle central control display panel arranged between the driver seat and the passenger seat comprising the display device as described in claim 1.

\* \* \* \* \*